United States Patent Office  3,525,713
Patented Aug. 25, 1970 }

3,525,713
REACTION OF HALOCYCLOALKENYLACYL
HALIDES WITH PREPOLYMERS
Herman S. Bloch, Skokie, and Louis Schmerling, Riverside, Ill., assignors to Universal Oil Products Company, Des Plaines, Ill., a corporation of Delaware
No Drawing. Continuation-in-part of application Ser. No. 400,933, Oct. 1, 1964. This application July 1, 1968, Ser. No. 741,306
Int. Cl. C08g 30/10
U.S. Cl. 260—47     11 Claims

ABSTRACT OF THE DISCLOSURE

Prepolymeric compositions of matter containing hydrogen which is replaceable by reaction with an acid halide are treated with halo-substituted cycloalkenylacyl halides to impart flame retardance thereto. For example, polyesters and polyamines may be treated with 1,4,5,6,7,7-hexachloro-5-norbornen-2-ylacetyl chloride or the analogous bromide thereof.

SPECIFICATION

This application is a continuation-in-part of our copending application, Ser. No. 400,933, filed Oct. 1, 1964, now U.S. Pat. No. 3,409,386 issued Nov. 5, 1968.

This invention relates to a process for the treatment of prepolymeric compositions of matter which possess a certain configuration whereby the treated prepolymer may then be polymerized and will possess desirable properties. More specifically, the invention is concerned with a process for the treatment of prepolymeric compositions of matter containing an active hydrogen which is replaceable by an acid halide with a halo-containing compound of the type hereinafter set forth in greater detail to prepare finished polymers which will possess the desirable physical characteristics.

The increased use of certain polymeric compositions of matter, either synthetic in origin or naturally occurring such as resins resulting from the curing of epoxy compounds, plastics such as polyesters, polyamides, polyvinyl alcohols (including mixed polyvinyl compounds containing alcohol groups), polyvinyl chlorides, polyacrylonitriles, polystyrene compounds, etc., foams such as polyurethane foams, textiles including rayon, nylon, etc., wool, leather, cotton, etc., or other cellulosic products such as paper, in situations where the finished article is normally subject to excessive heat or the possibility of contact with an open flame, necessitates rendering these articles as resistant to flame as is possible. For example, certain resins or plastics when molded or formed may be used as receptacles for electrical contacts, for architectural paneling, as bodies for airplanes, cars, boats, etc.; or, in addition, textiles may be used for male and female clothing, etc. It is therefore desirable that the finished product, either resins, plastics, or textiles, should possess the property of being flame retardant or flame resistant. In order to render the article of commerce resistant or retardant to flame, the article should contain, either as an element thereof or by impregnation therewith, some compound which will impart the aforesaid property of flame resistance or flame retardance to the specific article. In this respect it has now been discovered that certain compositions of matter will, when added to certain polymeric substances of the type hereinafter set forth in greater detail, impart the desirable property of flame resistance or flame retardance to the aforementioned article.

It is therefore an object of this invention to provide a process for treating certain prepolymeric compositions of matter whereby desirable physical properties will be imparted thereto.

A further object of this invention is to provide a process for treating certain prepolymeric substances which contain a hydrogen replaceable by reaction with an acid halide by reacting said substances with the aforesaid compositions of matter whereby flame retardancy will be imparted to the polymer.

In one aspect an embodiment of this invention is found in a process for the treatment of a prepolymeric material containing hydrogen which is replaceable by reaction with an acid halide, said process comprising reacting said material with a treating agent comprising a halo-substituted cycloalkenylacyl halide.

A further embodiment of this invention is found in a process for the treatment of a prepolymeric material containing hydrogen which is replaceable by reaction with an acid halide, said process comprising reacting said material with a treating agent consisting essentially of a compound of the formula:

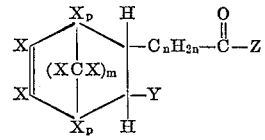

in which X is hydrogen or halogen, at least one X being halogen; Y is hydrogen or lower alkyl; Z is halogen; $m$ is an integer of from 0 to 2; $p$ is 2 when $m$ is 0 and $p$ is 1 when $m$ is greater than 0; and $n$ is an integer of from 0 to 2; and recovering the resultant treated material.

A specific embodiment of this invention is found in the treatment of a prepolymeric material comprising a polyamine with 1,4,5,6,7,7-hexachloro-5-norbornen-2-ylacetyl chloride, and recovering the resultant treated polymer.

Other objects and embodiments will be found in the following further detailed description of the present invention.

As hereinbefore set forth, it has now been discovered that certain polymeric compositions of matter may be made more resistant or retardant to flame by incorporating therewith certain compositions of matter which are generically referred to in the present specification as halo-substituted cycloalkenylacyl halides, and in the specification and appended claims as acid halides. These compounds which possess the desired property of flame retardancy may be prepared by reacting a halo-substituted cycloalkadiene or alkadiene with an unsaturated acid halide containing at least one hydrogen atom on each of the doubly-bonded carbon atoms. This reaction is effected at elevated temperatures ranging from about 100° to about 250° C. and preferably in a range of from about 125° to about 175° C. If so desired, the reaction may be effected in the presence of a substantially inert organic solvent or diluent such as aromatic hydrocarbons, including benzene, toluene, the xylenes, ethylbenzene, etc., or paraffinic hydrocarbons, both alicyclic and cyclic in nature, such as n-pentane, n-hexane, n-heptane, cyclopentane, cyclohexane, methylcyclopentane, etc.

Cycloalkadienic compounds which may be used and which contain halogen substituents, said compounds containing only carbon, hydrogen and halogen atoms, possess the generic formula:

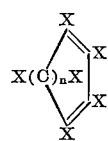

in which the X's are independently selected from the group consisting of hydrogen or halogen radicals having an atomic weight of from 35 to 127 (i.e., chlorine, bromine or iodine), at least one of the X's being halogen, and $n$ is an integer of from 1 to 2. Representative compounds include 1-chlorocyclopentadiene,
1,2-dichlorocyclopentadiene,
1,2,3-trichlorocyclopentadiene,
1,2,3,4-tetrachlorocyclopentadiene,
1,2,3,4,5-pentachlorocyclopentadiene,
hexachlorocyclopentadiene,
1-bromocyclopentadiene,
1,2-dibromocyclopentadiene,
1,2,3-tribromocyclopentadiene,
1,2,3,4-tetrabromocyclopentadiene,
1,2,3,4,5-pentabromocyclopentadiene,
hexabromocyclopentadiene,
1-iodocyclopentadiene,
1,2-diiodocyclopentadiene,
1,2,3-triiodocyclopentadiene,
1,2,3,4-tetraiodocyclopentadiene,
1,2,3,4,5-pentaiodocyclopentadiene,
hexaiodocyclopentadiene, etc.

It is also contemplated that polyhalo-substituted conjugated cyclohexadienes such as 1,2-dichloro-1,3-cyclohexadiene, 1,2,3-trichloro-1,3-cyclohexadiene, octachloro-1,3-cyclohexadiene, etc., 1,2-dibromo-1,3-cyclohexadiene, 1,-2,3-tribromo-1,3-cyclohexadiene, octabromo-1,3-cyclohexadiene, 1,2-diiodo-1,3-cyclohexadiene, 1,2,3-triiodo-1,3-cyclohexadiene, octaiodo-1,3-cyclohexadiene, etc., may also be used. In addition, it is also contemplated that the polyhalocycloalkadienes which may be used in preparing the treating agent of this process may contain more than one species of halo-substituents such as, for example, 1-chloro - 2-bromocyclopentadiene, 1,2-dichloro-3-bromocyclopentadiene, 1,2 - dichloro - 5,5 - dibromocyclopentadiene, etc., although not necessarily with equivalent results.

It is also contemplated that other halo-substituted compounds may be condensed or reacted with the unsaturated acid halide which is characterized by containing at least one hydrogen atom on each of the doubly-bonded carbon atoms. For example, halogenated conjugated open-chain diolefins containing only carbon, hydrogen and halogen atoms such as 1-chloro-1,3-butadiene,
1,3-dichloro-1,3-butadiene,
1-bromo-1,3-butadiene,
1,3-dibromo-1,3-butadiene,
1-iodo-1,3-butadiene,
1,1,3-trichloro-1,3-butadiene,
1,1,3-triiodo-1,3-butadiene,
1,1,2-trichloro-1,3-butadiene,
1,1,4-tribromo-1,3-butadiene,
1,1,4,4-tetrachloro-1,3-butadiene,
1,1,4,4-tetrabromo-1,3-butadiene,
1,1,4,4-tetraiodo-1,3-butadiene,
1,3-dichloro-2-methyl-1,3-butadiene,
1,4-dichloro-2-methyl-1,3-butadiene,
1,1,4,4-tetrachloro-2-methyl-1,3-butadiene,
1,1,4,4-tetrabromo-2-methyl-1,3-butadiene,
1,4-diiodo-2-iodomethyl-1,3-butadiene,
1,1-dichloro-3-bromo-1,3-butadiene,
1-chloro-3-bromo-1,3-butadiene,
1-iodo-3-chloro-1,3-butadiene,
2-bromo-3-chloro-1,3-butadiene,
1,4-dichloro-2-bromomethyl-1,3-butadiene,
1,4-dichloro-2-iodomethyl-1,3-butadiene, etc.

may also be used.

The unsaturated acid halides which are used in preparing the treating agents are characterized by containing at least one hydrogen atom on each of the doubly-bonded carbon atoms; they include monobasic acid halides such as acrylyl chloride, acrylyl bromide, vinylacetyl chloride, vinylacetyl bromide, crotonyl chloride, crotonyl bromide, propylideneacetyl chloride, propylideneacetyl bromide, ethylidenepropionyl chloride, ethylidenepropionyl bromide, allylacetyl chloride, allylacetyl bromide, etc.

The compounds resulting from the reaction between the halo-substituted alkadienic or cycloalkadienic compound with an unsaturated acid halide which contains at least one hydrogen atom on each of the doubly-bonded carbon atoms are halo-substituted cycloalkenylacyl halides, a term which for purposes of this invention, as used in the present specification and appended claims, includes halo-substituted mono-, bi- and polycycloalkenylacyl halides. Such compounds include 2,3-dichloro-3-cyclohexenylacetyl chloride,
2,3-dichloro-3-cyclohexenylacetyl bromide,
2,3,4,5-tetrachloro-3-cyclo-hexenylacetyl chloride,
2,3,4,5-tetrachloro-3-cyclohexenylacetyl bromide,
2,3,4,5-tetrabromo-3-cyclohexenylacetyl chloride,
2,3,4,5-tetrabromo-3-cyclohexenylacetyl bromide,
2,3-dichloro-3-cyclohexenylcarbonyl chloride,
2,3-dichloro-3-cyclohexenylcarbonyl bromide,
2,3,4,5-tetrachloro-3-cyclohexenylcarbonyl chloride,
2,3,4,5-tetrachloro-3-cyclohexenylcarbonyl bromide, etc.,
1,4-dichloro-5-norbornen-2-ylacetyl chloride,
1,4-dichloro-5-norbornen-2-ylacetyl bromide,
1,4,5,6,7,7-hexachloro-5-norbornen-2-ylacetyl chloride,
1,4,5,6,7,7-hexachloro-5-norbornen-2-ylacetyl bromide,
1,4,5,6,7,7-hexabromo-5-norbornen-2-ylacetyl chloride,
1,4,5,6,7,7-hexabromo-5-norbornen-2-ylacetyl bromide,
1,4-dichloro-5-norbornen-2-carbonyl chloride,
1,4-dichloro-5-norbornen-2-carbonyl bromide,
1,4,5,6,7,7-hexachloro-5-norbornen-2-carbonyl chloride,
1,4,5,6,7,7-hexachloro-5-norbornen-2-carbonyl bromide,
1,4,5,6,7,7-hexabromo-5-norbornen-2-carbonyl chloride,
1,4,5,6,7,7-hexabromo-5-norbornen-2-carbonyl bromide,
1,4-dichloro-3-methyl-5-norbornen-2-carbonyl chloride,
1,4-dichloro-3-methyl-5-norbornen-2-carbonyl bromide,
1,4,5,6,7,7-hexachloro-3-methyl-5-norbornen-2 carbonyl chloride,
1,4,5,6,7,7-hexachloro-3-methyl-5-norbornen-2-carbonyl bromide,
1,4,5,6,7,7-hexabromo-3-methyl-5-norbornen-2-carbonyl bromide, etc.

Examples of synthetic prepolymeric compounds which may be treated with a halo-substituted cycloalkenylacyl halide to render the resulting polymers resistant to flame comprises those prepolymers which contain a hydrogen atom which is replaceable by reaction with an acid halide. Specific examples of these prepolymeric compositions of matter are characterized by the presence of hydroxy, thio, or amino groups, these latter groups containing the hydrogen which is replaceable by reaction with the acid chloride group of the halo-substituted cycloalkenylacyl halide. Representative illustrative examples of these prepolymers will include polyesters, polyamides, polyurethanes, epoxy resins, polyvinyl alcohols and compounds prepared by incorporating compounds such as polyvinyl chloride, polyvinyl acetates, and polystyrene with about 2 to about 20% by weight of vinylbenzyl alcohol, etc. It is to be considered within the scope of this invention that compounds which do not contain a replaceable atom may have incorporated therewith a small amount of a compound containing a replaceable hydrogen atom. Such compounds would include polyamino compounds such as diethylenetriamine, triethylenetetramine, dipropylenetriamine, tripropylenetetramine, or polyhydroxy compounds, such as glycols, etc. After incorporation of these compounds, the resulting mixture is then reacted with the acid chloride.

As hereinbefore set forth, polymers of the type above mentioned are admixed with the halo-substituted cycloalkenylacyl halides. The acyl halide is utilized to endow the resulting polymers with the necessary physical properties such as flame retardancy. The prepolymers which possess a replaceable hydrogen atom or which are admixed with a compound possessing the necessary replaceable hydrogen atom may be treated with these acid halides in either a batch or continuous type operation. For example, a prepolymeric substance such as a component of a polyester as, for example, propylene glycol or glycerol, may be reacted with, in general, less than an equivalent proportion of halo-substituted cycloalkenylacyl halide such as 1,4,5,6,7,7-hexachloro-5-norbornen-2-ylacetyl chloride and thereafter the rseulting mixture may be treated with maleic anhydride to form the desired polyester. The polyester thus prepared which may comprise a relatively low molecular weight compound can thereafter be utilized as a molding resin, coating material, plasticizer, etc. In addition, low molecular weight polyesters, formation of which involved an acid chloride, may also be epoxidized and used as a stabilizing plasticizer for polyvinyl chloride resins. Other types of plastics or resins which are polymeric in nature which may be prepared include polyurethane foams which will contain an acid halide of the type hereinbefore set forth. In addition, the halo-substituted cycloalkenylacy halides may be reacted with polyamines to form partially amidized amino components of polyamides. When the resulting polyamide is a low molecular weight compound, that is, a compound having a molecular weight of about 2000 or less, the resulting resin may be used as an adhesive; if the resulting polyamide is a high molecular weight compound and is linear in nature, the compound may be used as a molding resin, as a fiber, or film former. The halo-substitute cycloalkenylacyl halide will act as a condensation controlling agent and thus enable the finished product to possess the desired average molecular weight and physical characteristics as well as properties of fire resistance or flame retardance.

The prepolymers which contain replaceable hydrogen atoms capable of reaction with an acid halide and the halo-substituted cycloalkenylacyl halide may be reacted in any manner known in the art, the reaction conditions such as temperature and pressure being dependent upon the particular prepolymers undergoing curing or crosslinking. Usually, the curing or cross-linking of the prepolymer with a particular halo-substituted cycloalkenylacyl halide will be effected at a temperature ranging from ambient (about 25° C.) up to about 300° C. or more in the presence of a mildly alkaline neutralizing agent. In addition, if so desired, pressures ranging from atmospheric up to about 50 atmospheres or more may be used, the superatmospheric pressure being provided for by the introduction of an inert gas such as nitrogen into the reaction zone. The particular pressure which is to be employed will be that which is sufficient to maintain a major portion of the reactants in the liquid phase.

As hereinbefore set forth, the reaction may be effected in either a batch or continuous type operation. When a batch type operation is used the prepolymer and the acid halide are placed in an appropriate reaction apparatus which is thereafter adjusted to the desired operating conditions of temperature and pressure. Upon completion of the desired residence time which may range from about 0.5 up to about 10 hours or more in duration, the product is recovered and thereafter treated with an additional material to produce the desired polymer.

When utilizing a continuous method of operation, the prepolymer and the acid halide are continuously charged to a reaction zone which is maintained at the proper operating conditions of temperature and pressure. Upon completion of the desired residence time, the reactor effluent is continuously withdrawn and the desired product is separated from any unreacted starting materials which may be recycled to form a portion of the feed stock. Thereafter, the reaction product is treated with another compound to produce the finished polymeric compositions of matter.

It is contemplated that the acyl moiety will be present in the finished reaction product in various concentrations, ranging from about 5% up to about 50% or more of the finished product, a particular concentration being dependent upon the particular use to which the finished polymeric product will be put.

The following examples which are given to illustrate the process of the present invention are not, however, intended to limit the generally broad scope of the present invention in strict accordance therewith.

EXAMPLE I

A mixture of 135 grams (0.5 mole) of hexachlorocyclopentadiene and 51.5 grams (0.5 mole) of vinylacetyl chloride was dissolved in 25 cc. of xylene and the solution was placed in a condensation apparatus provided with heating and refluxing means. The solution was then heated under reflux, the temperature rising from about 122° to about 154° C. during a period of about 6 hours. The temperature was maintained at 154° C. for an additional period of about 1.5 hours during which time some hydrogen chloride was evolved. At the end of this time the flask and contents thereof were allowed to cool to room temperature after which the reaction mixture was subjected to fractional distillation under reduced pressure. The cut boiling at 135°–136° C. at 1.0–1.1 mm. pressure was recovered. This cut comprising 1,4,5,6,7,7-hexachloro-5-norbornen-2-ylacetyl chloride was obtained in 56% yield. It was analyzed with the following results:

Calculated for $C_9H_5OCl_7$ (percent): Cl, 65.64. Found (percent): Cl, 65.5.

The compound crystallized on standing yielding crystals having a melting point of 48°–50° C.

EXAMPLE II

In this example a prepolymer is prepared by partially condensing 103 grams (1.0 mole) of diethylenetriamine with 146 grams (1.0 mole) of adipic acid. The prepolymer is then further reacted with 188 grams (0.5 mole) of 1,4,5,6,7,7-hexachloro-5-norbornen-2-ylacetyl chloride and the condensation completed to form a polymer which possesses an excellent physical property of flame retardancy.

EXAMPLE III

A polyester resin is prepared by charging 99 grams (1.3 mole) of propylene glycol to a reaction vessel which is then heated under a nitrogen blanket to a temperature of about 120° C. An adduct comprising 1,4,5,6,7,7-hexachloro-5-norbornen-2-ylacetyl chloride (0.4 mole) prepared in a manner similar to that set forth in Example I above is gradually charged to the reaction vessel which is maintained at a temperature of about 110° C. Upon completion of the addition of the adduct, the flask and contents thereof are then heated to a temperature of about 160° C. and maintained thereat for a period of about 8 hours. Following this, 40 grams (0.41 mole) of maleic anhydride is added to the reaction vessel which is thereafter maintained at a temperature of about 165° C. for an additional period of 8 hours. At the end of this time the resin which formed is recovered by pouring the same onto an aluminum foil. The solid resin will be ignited with difficulty when held in the flame of a Bunsen burner and will be self-extinguishing as soon as it is removed from the direct flame.

EXAMPLE IV

In this experiment a prepolymer is prepared by condensing one mole of 1,4,5,6,7,7-hexabromo-5-norbornen-2-ylacetyl bromide with one mole of 1,2,6-hexanetriol. The resulting product is then admixed with toluene-2,4-diisocyanate to form a rigid white polyurethane which will be self-extinguishing when removed from direct contact with a flame.

EXAMPLE V

A liquid epoxy resin comprises the prepolymer in this example. Specifically, a liquid resin having an epoxide equivalent weight of 190, and known in the trade as "Epon 828," an unmodified bisphenol-A epoxy resin, is admixed with 1,4,5,6,7,7-hexachloro - 5 - norbornen-2-yl-acetyl chloride. The resulting mixture is heated until said mixture becomes homogeneous and is poured into molds which are prepared from glass sheets using polytetra-fluoroethylene spacers. In addition, a mold release agent is also used to facilitate removal of the cured resins from the molds. The molds are placed in a circulating oven and allowed to cure for a period of about 6 hours at a temperature of 110° C. The sheets are then removed from the mold, cut into strips and are evaluated for flame retardancy. In addition to possessing excellent heat distortion temperatures and hardness, as measured by a Shore durometer, the cured resin will be found to be self-extinguishing when removed from direct action of a flame.

EXAMPLE VI

In this example a prepolymer is prepared by reacting polyvinyl acetate with maleic acid and distilling off acetic acid which is liberated. The resulting composite is then admixed with 1,4,5,6,7,7-hexachloro - 5 - norbornen-2-yl-acetyl chloride and glycerol and the resulting mixture is heated at a temperature of about 150° C. for a period of about 6 hours. At the end of this time, the resin which is formed is recovered and treated for flame retardancy. The resin will be found to be self-extinguishing as soon as it is removed from a direct flame.

EXAMPLE VII

Other polymeric products such as alkyd resins may be prepared by reacting a halo-substituted cycloalkenylacyl halide such as 1,4,5,6,7,7-hexachloro-5-norbornen-2-yl-acetyl chloride with the product of partial condensation of glycerol, a dibasic acid such as phthalic anhydride and a fatty acid such as linseed oil and then further condensing the prepolymer to form oil-extended alkyd resins. These alkyd resins thus formed can be used as intermediates in paints and varnishes to impart finishes to objects which have a high hardness and gloss and which are water and alkali resistant. In addition, the finished product will also have excellent flame-retardant properties.

We claim as our invention:

1. A process for the treatment of a prepolymeric material containing hydrogen, which is replaceable by a reaction with an acid halide, said process comprising reacting said material with said acid halide of the formula:

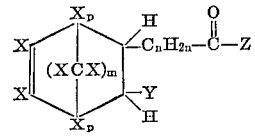

in which X is hydrogen or halogen, at least one X being halogen; Y is hydrogen or lower alkyl; Z is halogen; $m$ is an integer of from 0 to 2; $p$ is 2 when $m$ is 0 and $p$ is 1 when $m$ is greater than 0; $n$ is an integer of from 0 to 2; and recovering the resultant treated material.

2. The process as set forth in claim 1 wherein Z and at least one X are chlorine.

3. The process as set forth in claim 1 wherein Z and at least one X are bromine.

4. The process of claim 1 in which said compound is 1,4,5,6,7,7-hexachloro-5-norbornen-2-ylacetyl chloride.

5. The process of claim 1 in which said compound is 1,4,5,6,7,7-hexabromo-5-norbornen-2-ylacetyl bromide.

6. The process of claim 1 in which said prepolymeric material is a polyamine.

7. The process of claim 1 in which said prepolymeric material is a polyester.

8. The process of claim 1 in which said prepolymeric material is a polyvinyl alcohol.

9. The process of claim 1 in which said prepolymeric material is a polyhydric alcohol.

10. The process of claim 1 in which said prepolymeric material is a polyurethane.

11. The process of claim 1 in which said prepolymeric material is an epoxy resin.

References Cited

UNITED STATES PATENTS 2,812,347  11/1957  Newcomer et al.

WILLIAM H. SHORT, Primary Examiner
T. E. PERTILLA, Assistant Examiner

U.S. Cl. X.R.

8—94.1, 115.5, 120, 128; 106—164; 260—2.5, 9, 75, 78, 77.5, 88.7, 91.3, 92.8, 93.5, 212